US006383552B1

(12) United States Patent
Noecker et al.

(10) Patent No.: US 6,383,552 B1
(45) Date of Patent: *May 7, 2002

(54) THIN-WALLED NATURAL RUBBER LATEX MATERIAL SUBSTANTIALLY FREE OF SULFUR AND NITROSAMINES, AND METHOD OF MAKING SAME

(76) Inventors: Audra Noecker, 21400 N. Shore Dr., Sturgis, MI (US) 49091; Ho Teon Hau, 7 SS23/5, Taman SEA, 47400, Petaling Jaya Selangor (MY)

( * ) Notice: Subject to any disclaimer, the term of this patent is extended or adjusted under 35 U.S.C. 154(b) by 0 days.

This patent is subject to a terminal disclaimer.

(21) Appl. No.: 08/521,244

(22) Filed: Aug. 30, 1995

(51) Int. Cl.$^7$ ................................. B32B 9/04
(52) U.S. Cl. ................ 427/2.3; 428/35.2; 428/446; 428/447; 428/484; 428/492; 2/161.7
(58) Field of Search ................. 428/447, 446, 428/35.2, 35.5, 484; 427/2.3

(56) References Cited

U.S. PATENT DOCUMENTS

| | | |
|---|---|---|
| 3,411,982 A | 11/1968 | Kavalir et al. |
| 3,872,515 A | 3/1975 | Miner et al. |
| 3,914,478 A | 10/1975 | Johansson et al. |
| 3,967,014 A | 6/1976 | Esemplare et al. |
| 4,061,709 A | 12/1977 | Miller |
| 4,082,862 A | 4/1978 | Esemplare et al. |
| 4,092,279 A | 5/1978 | Piskoti |
| 4,304,008 A | 12/1981 | Joung |
| 4,526,579 A | 7/1985 | Ainpour |
| 4,538,920 A | 9/1985 | Drake |
| 4,657,959 A | 4/1987 | Bryan et al. |
| 4,955,392 A | 9/1990 | Sorkin |
| 5,133,090 A | 7/1992 | Modak et al. |
| 5,213,723 A | 5/1993 | Aoshima et al. |
| 5,254,635 A | 10/1993 | Stevenson |
| 5,284,607 A | 2/1994 | Chen |
| 5,292,815 A | 3/1994 | Wreesmann et al. |
| 5,296,549 A | 3/1994 | Suyama et al. |
| 5,335,373 A | 8/1994 | Dangman et al. |
| 5,458,588 A | 10/1995 | Amdur et al. |
| 5,472,493 A | 12/1995 | Regan |
| 5,612,083 A | * 3/1997 | Huang et al. ................ 427/3.2 |
| 6,051,320 A | * 4/2000 | Noecker et al. ............ 428/447 |

OTHER PUBLICATIONS

Cabot Corporation, Aqueous Dispersions of Cab–O–Sil, May 1961 Cab–O–Sil Fumed Silica Properties and Functions, Cabot Corporation 6/87.

Technical Bulletin Pigments, Aqueous Aerosil and Aluminium Oxide No. 33 Cab–O–Sil—How To Use It Where To Use It, Cabot Corp. Dispersions.

Godfrey L. Cabot, Inc., Cab–O–Sil, In The Rubber Industry, Jan. 1955.

Kenneth A. Loftman, Cab–O–Sil In Dipped Latex Films, Technical Service Laboratory Report, Aug. '59.

Chemical & Engineering News, Soviet Chemical Industry, Jan. 18, 1988.

Cab–O–Sperse, Aqueous Fumed Silica Dispersions, Cabot Corporation 1986.

Rubber Chemicals, vol. 20, pp 337–364, Rubber Compounding, pp 418–425, and Rubber Compounding, pp. 468–491, all taken from Encyclopedia of Chemical Technology, 4th Ed. 1994.

Carver Technologies Ltd., Powder–Free Latex Gloves–1995 Publication.

* cited by examiner

*Primary Examiner*—Donald R. Wilson
(74) *Attorney, Agent, or Firm*—Carrier, Blackman & Associates, P.C; Joseph P. Carrier; William D. Blackman

(57) ABSTRACT

A thin walled rubber latex material is disclosed suitable for forming gloves, and the like. A thin walled material is formed using sulfur-free, oxygen-donating curing agents such as butyl peroxides, alkyl peroxides and peroxyesters so that the material is not chemically reactive with other substances that may be contacted by the material during subsequent use of same. The material is also formed using non-amine antioxidants so that it is substantially free of nitrosamines, and the material is also provided with a heat resistant and water resistant coating which blocks transfer of latex proteins from the material to persons who contact the materials over prolonged periods of time.

10 Claims, 2 Drawing Sheets

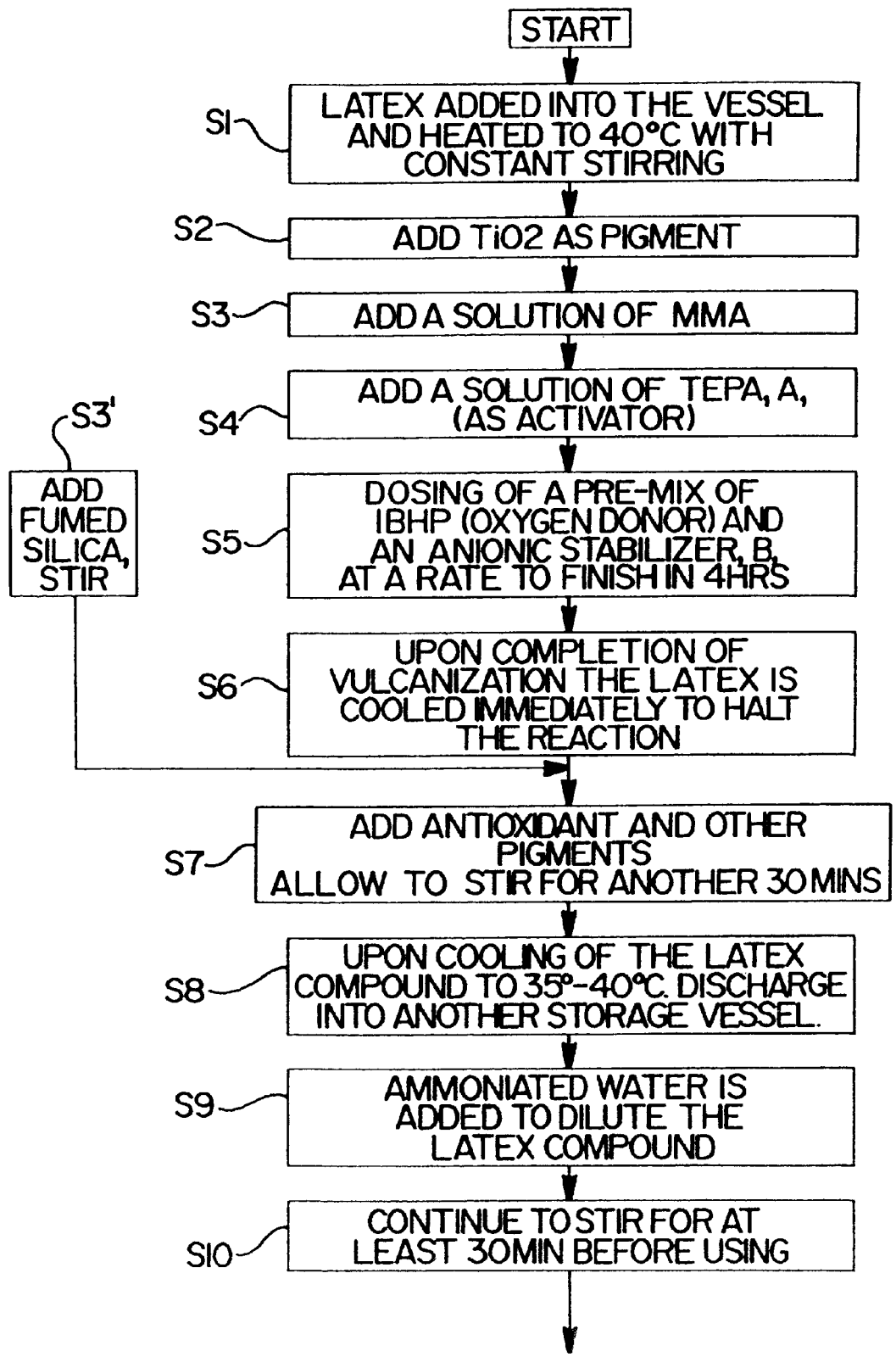
FIG IA

THIN-WALLED NATURAL RUBBER LATEX MATERIAL SUBSTANTIALLY FREE OF SULFUR AND NITROSAMINES, AND METHOD OF MAKING SAME

This application is a parent of application Ser. No. 08/687,255, filed Jul. 25, 1996 (now U.S. Pat. No. 6,051,320).

BACKGROUND OF THE INVENTION

1. Technical Field of the Invention

The present invention pertains to a sulphur free prevulcanized rubber latex, and to a method of producing same and articles produced therefrom. More particularly, the present invention pertains to a method of manufacturing sulfur-free, natural rubber latex and for forming same into thin walled articles such as gloves so that the resulting articles are not chemically reactive with other substances which may be contacted by the articles during subsequent use, and so that the articles are otherwise completely safe for substantially any application, including those involving with humans.

2. Description of Relevant Art

Rubber is a very common compound. It is available in many different compositions and forms such as rubber latex. In conventional processes for forming rubber, or for forming products from rubber, rubber is cured or vulcanized so as to join the modules within the rubber composition together giving the rubber composition desired strength and toughness. Most typically sulphur or sulphur donating compounds are used as the primary curing or vulcanizing agents.

For example, there are many publications available, including publications by Uniroyal, Vanderbilt and Monsanto describing start-formulas or for sulphur-cure natural rubber systems. Typically, these formulas will include sulphur or a partial substitute of sulphur such as TMTD, DIAK and Sulfasan (partial substitutes of sulfur being preferred especially when controlled release of available sulphur is required), a zinc-based cross linking agent such as zinc dithiocarbamate (ZDBC) and zinc diethylcarbamate (ZDEC), cure rate accelerators (primary and secondary) such as excessive sulphur, ZDBC and sodium diethylcarbamate (SDBC), and an antioxidant which are mostly phenolic or amine compounds.

Although products formed from such sulphur-cured natural rubber exhibits some very good qualities, including strength, toughness, elasticity, etc. and are used very effectively in many applications, there are some areas of applications where compatibility problems arise due to the chemicals incorporated into the rubber which react undesirably with foreign materials contacted by products formed from the rubber during the products'subsequent use. Particularly, the sulphur, sulphur compounds, dithiocarbamate compounds, zinc and its compounds which are present on and/or in the surfaces of products formed from the rubber may react with foreign materials contacted during use of the products, resulting in contamination, fouling, spoilage or discoloration of rubber products or of the materials contacted therewith (either directly or indirectly). Additionally, nitrosamine, which is often used as an antioxidant in conventional rubber compositions or is generated by the amine compounds used as antioxidants, is believed to be carcinogenic, and hence it is undesirable to use these compounds as antioxidants where products formed from the rubber composition are likely to be contacted by humans, such as with their skin, body fluids, or in their mouths.

A specific example of a problem which has arisen due to a chemical reaction between chemicals in a conventional rubber product and a foreign material contacted by the rubber product during use is in the field of latex examination gloves. Such gloves are almost always used by persons in the medical and dental field during any procedure requiring bodily contact with a patient, such use is even required by federal and/or state laws in many instances and such gloves are also being used in many other fields. Throughout the application the term "latex gloves" refers to any type of latex glove including examination gloves, surgical gloves, and all purpose gloves.

A common procedure involved in dental examinations is the taking of an impression of a patient's upper or lower dental arch, or of one or several teeth. Such impressions are formed using a gel-like dental impression material (DIM) in a metal or plastic container which is pressed against the dental structure to obtain a negative impression of the patient's teeth or arch. Upon removal of the impression material and container from the patient's oral cavity, it is allowed to cure and harden. Once hardened, a second material such as a flowable plaster is poured into the hardened, negative impression material to obtain a positive impression of the teeth or arch. One such DIM is vinyl polysiloxane distributed by 3M under the Trademark EXPRESS™.

The dental community has recently observed a re-occurring problem in forming negative impressions from the DIM caused by chemical reaction(s) with chemicals contained on/in conventional rubber latex gloves. Specifically, after a negative impression has been obtained of the patient's dental structure, portions of the exposed regions of the DIM which had been in contact (direct or indirect) with the gloves fail to sufficiently cure and harden. Instead, those regions remain uncured and retain their gel-like consistency. This is most undesirable when attempting to subsequently form the positive impression since the uncured regions of the negative impression do not sufficiently retain and transfer the structure and surface details of the patient's teeth or arch which had been previously contacted, to the positive impression material. Regions of the DIM remain uncured because chemicals on/in the latex gloves react with and tie up the platinum base catalyst of the DIM, which catalyst normally assures rapid curing and hardening of the DIM.

Previously, applicant has proposed to overcome such glove contamination problem through post treatment of the manufactured gloves to tie up and/orbarricade the offending chemicals on/inthe gloves. Particularly, applicant has proposed to tie up the offending chemicals by treating the exterior surfaces of the latex glove with an acidic suspension of metal particles, such as relatively dilute solution of phosphoric acid (0.25–2.0 molar) with finally divided copper and/or iron particles therein. The suspension is applied to the glove exterior in any appropriate manner such as spraying, brushing, wiping, dipping, etc. after which the treated gloves are allowed to dry. Alternatively, or additionally, a water resistant (preferably insoluble) barricade coating was applied to the exterior of the gloves, including such coating materials as silicone spray, polyethylene, PVC, polysilane, octyl acrylamid, acrylate copolymer VA, chrononates, vinyl neodecanoate copolymer, ethylester of polyvinyl, nathacrylate-methylacrylate copolymer, etc.

Although such post treatments of the conventional latex gloves were usually effective for overcoming undesirable chemical reactions between chemicals of the latex gloves and foreign materials such as the DIM contacted by the latex gloves during use, the treated gloves still undesirably reacted with the DIM approximately 10% of the time and this was an unacceptable failure rate. Further, such post treatments have other problems and disadvantages associated therewith, including the additional cost involved with the post treatments, shelf life and reliability of the post treated gloves, undesired reactions of the post treatment materials with other foreign materials subsequently contacted by the gloves, etc.

The curing and vulcanization of rubber compounds may be done at various stages relative to the formation or shaping of products from the rubber compounds. For example, in the manufacture of latex gloves from latex emulsions, it is conventional to vulcanize the composition after it has been shaped into gloves (post-vulcanization process), or the latex emulsion may be vulcanized before it is shaped into the gloves (pre-vulcanization). Typically, the chemicals used for vulcanizing the rubber compositions are consumed more efficiently in pre-vulcanization processes because vulcanization occurs with respect to a large mass of material over a longer length of time. On the other hand, pre-vulcanized gloves are known to be tacky and soft in comparison to the post-vulcanized gloves, which leads to handling problems.

Another problem associated with rubber latex gloves pertains to the latex proteins inherently found therein. Latex proteins, which exist naturally in natural rubber latex, are essential an emulsifier to the polyisoprene and thus maintain the latex state. Unfortunately, the proteins have caused allergic reactions and other serious health problems in humans, and the latex proteins appear to have a relative progressive effect on humans such that the undesirable reactions increase in severity with increased exposure to the proteins. Conventionally, latex gloves include a powder such as corn starch on the surfaces thereof which facilitates removal of the gloves from a mold and facilitates placing gloves on and removing the gloves from users' hands. Although the powder acts as a layer between the latex glove and the hand wearing the glove, the latex proteins readily pass through the powder to the skin. In light of the health problems associated with exposure to the latex proteins, two alternative treatments for the gloves have been conventionally utilized to significantly reduce or eliminate the possibility that persons wearing the latex gloves will contact the latex proteins therein. Gloves treated according to such additional treatments are known as "powder-free". The first of such additional treatments is chlorination of the gloves, which removes some of the proteins on the gloves. Such chlorination treatment actually weakens the gloves because it initiates a deterioration process, but conventional sulfur-cured gloves remain sufficiently strong even after chlorination. The second of such additional processes is a wax coating process whereby the surfaces of the conventional powdered gloves are coated with an ingestible, biodegradable wax material. The wax material may be carnauba wax, which is the same as that used on the candy shells of certain candy products such as M&Ms®. Although such wax coating does not degrade the desired characteristics of the latex glove, it does tend to melt to some extent after being maintained at body temperature over a period of time, and this is undesirable because the melted wax leaves a residue on users' hands after the gloves are removed, which residue is often subsequently transferred to instruments or other articles handled by the users.

The present invention has been developed to overcome the problems and disadvantages of known rubber latex gloves as discussed above, and to fulfill a great need in the art by providing a composition which is essentially free of active chemical compounds (such as sulphur, diocarbamates, zinc compounds, etc.) found in conventional sulphur-cured rubber latex products, which is free of other or undesirable chemicals such as nitrosamine, and yet has adequate strength, elongation and other desired characteristics that it can be used in most applications; as well as an efficient, economical process for manufacturing useful products such as latex gloves from the rubber latex composition.

SUMMARY OF THE INVENTION

According to the invention there is provided a thin walled rubber latex material, comprising a thin layer of rubber latex having an oxygen-donating curing agent, an activating agent and at least one of an emulsifier and a stabilizer therein, and wherein the latex is pre-vulcanized as an emulsion prior to being shaped into the layer such that substantially none of the oxygen-donating curing agents remains free in the rubber latex layer. Preferably the oxygen-donating curing agent is a peroxide such as butyl peroxides and alkyl peroxides, or peroxyesters, and combinations thereof, and the rubber latex is natural rubber latex. The rubber latex will be formed using a non-amine anti-oxidizing agent so that it contains substantially no nitrosamine.

According to other preferred aspects of the invention: the rubber latex will additionally include an organic strength enhancing agent such as monomers and/polymers of families of acrylics and esters, together with a sulphur-free cross linking agent such as tert-butyl hydroperoxide or tetraethylenepentamine for cross linking the organic strength enhancing agent to with polysoprene in the natural rubber latex; the thin walled rubber latex material will additionally include a coating over the rubber latex layer for blocking transfer of latex proteins from the rubber latex layer to persons wearing the material and the blocking coating being heat resistant and water resistant such that it remains in a solid, non-flowable state after prolonged exposure to human body temperatures.

Also according to the invention there is provided a process for manufacturing thin walled rubber latex material, comprising the steps of: preparing an emulsion of rubber latex together with an oxygen-donating curing agent, an activating agent and at least one of an emulsifier and a stabilizer, pre-vulcanizing the emulsion until it is stable such that substantially none of the curing agent remains free therein; polymerizing polyisoprene molecules in the rubber latex with an organic strength enhancing agent; forming the stable emulsion into a thin walled material; leaching the formed material to remove undesired latex proteins and chemicals therefrom; and drying the leached, thin walled material. Again, it is preferred that: the oxygen-donating curing agent is preferably a butyl-peroxides, alkyl-peroxides, peroxyesters, and combinations thereof; that the rubber latex is natural rubber latex; that the organic strength enhancing agent comprised polymers and/or monomers of families of acrylics and esters, and that the polymerization step involves the use of an organic cross-linking agent such as tert-butyl hydroperoxide and tetraethylene pentamine; that the process also includes a step of adding nitrogen free anti-oxidant(s) to the latex emulsion such that the manufactured thin walled rubber latex material is substantially free of nitrosoamine, and a step of applying a blocking coating to the thin walled rubber latex material, which coating is substantially impermeable to the latex protein and heat resistant such that it remains in a non-flowable state after prolonged exposure to the human body temperatures.

It is also preferred that the rubber latex material will be formed in the shape of gloves.

It is an object of the invention to provide a thin walled rubber latex material (shaped as gloves or other objects to be worn by humans) which does not contain chemicals or chemical compounds that will react with foreign materials contacted by the thin walled rubber latex material during subsequent use thereof, and to an efficient and economically practical process for manufacturing such rubber latex material.

It is another object of the invention to provide such as thin walled rubber latex material which may be safely and conveniently worn over an extended periods of time by humans without transfer of the latex proteins in the material to human skin in contact therewith.

It is a further object of the invention to provide such a natural rubber latex material having adequate strength, elongation, texture and other characteristics that it may be reliably used for substantially any application in the medical and dental fields.

Other objects, advantages and salient features of the invention will become apparent from the following detailed description which, when taken in conjunction with the indexed drawings, discloses preferred embodiments of the invention.

BRIEF DESCRIPTION OF THE DRAWINGS

The drawing FIGS. 1A and 1 B are flow charts showing the steps of manufacturing a thin walled rubber latex material according to a preferred embodiment of the invention.

DETAILED DESCRIPTION

Figure 1B:
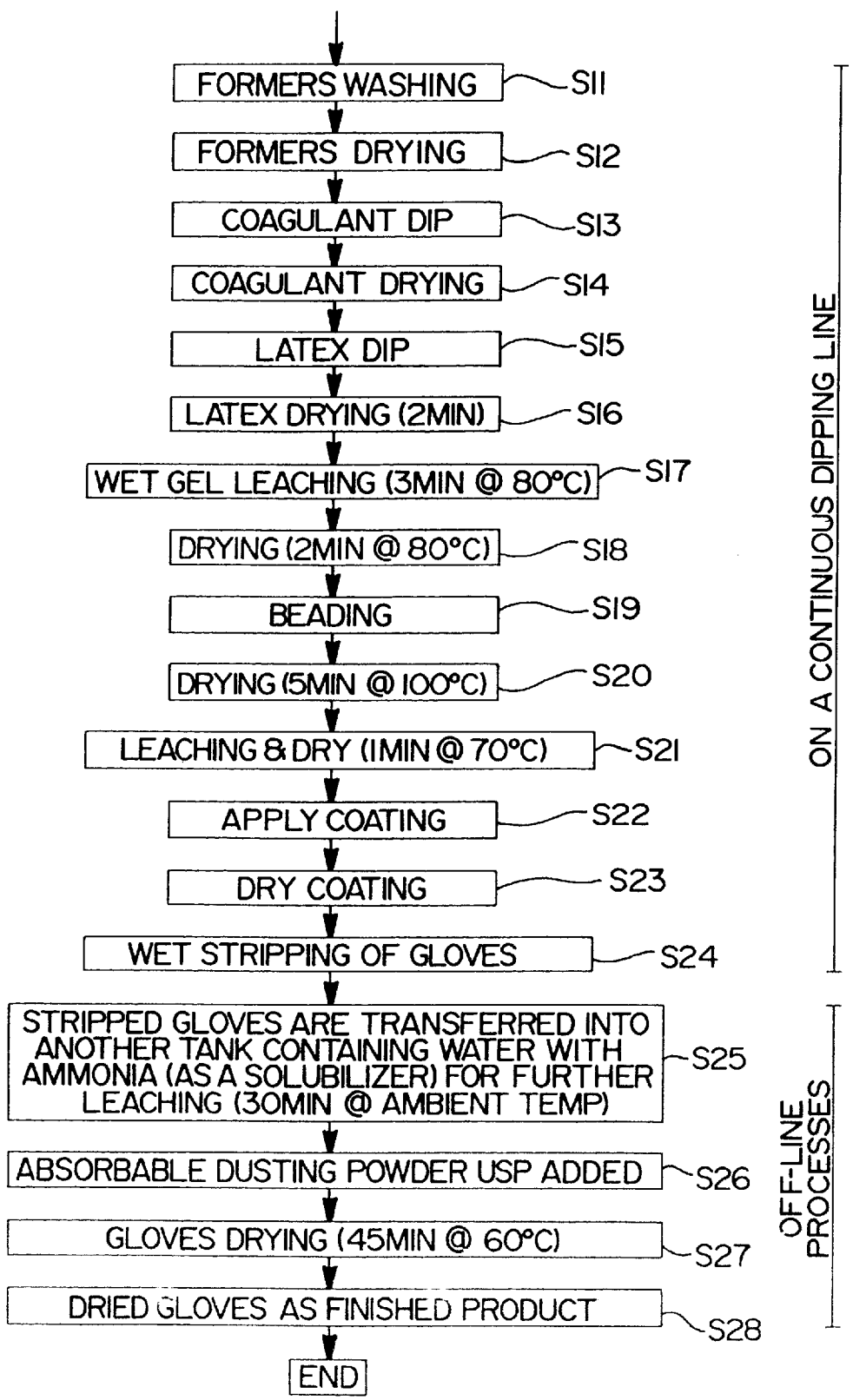

Referring to the drawing there is shown a block diagram of a process for manufacturing thin walled rubber latex material according to the preferred embodiment of the invention. In the first step, S1, a rubber latex emulsion is prepared in a heated reaction vessel with constant mechanical stirring. The latex emulsion includes the conventional natural rubber latex base with polyisoprene. Ultimately, the reaction vessel will be heated to a temperature of about 40–80° C., and the temperature is closely monitored throughout the reaction process to make sure it does not rise to an excessive temperature. At step S2, a pigment such as titanium dioxide $TiO_2$ is added to the emulsion. At S3, a monomer and/or polymer is added to the emulsion which will polymerize with the polyisoprene molecules of the rubber latex to give the resulting materials enhanced strength and other desired characteristics. Appropriate monomers and polymers include families of acrylics such as methamethylacrylic (MMA) and families of esters.

At step S4 appropriate activator(s) are added to the emulsion which, like the oxygen-donating curing agents, do not render the final rubber latex material chemically reactive. Some appropriate activators include sugars such as glucose, fructose, lactose, catechol or other substances with the same functional (hydroxy) group; tetraethylenepentamine (TEPA); aldehydes; and other reducing agents. TEPA is a particularly preferred activator because it not only activates the emulsion, but additionally functions as a cross-linking agent for cross-linking the monomers or polymers such as MMA to the polyisoprene molecules of the rubber latex.

In step S5 a mixture of an oxygen-donating curing agent together with an emulsifier and/or stabilizer are slowly added to the latex emulsion over an extended period of time such as 3–7 hours, and while the temperature of the vessel is maintained at an elevated temperature such as 60–80° C. During this time period the latex emulsion is pre-vulcanized by the oxygen-donating curing agent and concurrently the monomer and/or polymer added to the emulsion is cross-linked with the polyisoprene of the rubber latex. In this batch type prevulcanization of the latex emulsion, the oxygen-donating curing agent is fully consumed (the donated oxygen is either incorporated in the vulcanized rubber latex or discharged from the emulsion as a vapor) so that no further curing reaction occurs. According to an important aspect of the invention, appropriate oxygen-donating curing agents which may be used to vulcanize the rubber latex include: butyl-peroxides such as tert-butyl peroxide, di-t-butyl peroxide, bis-2-ethylhexyl peroxydicarbonate, etc.; alkyl-peroxides; and peroxyesters. Appropriate emulsifiers and stabilizers include laureate salts, casein salts, non-ionic and ionic soaps.

As an alternative or supplement to the addition of the organic strength-enhancing agent and activator therefor in steps S3 and S4, a non-organic strength enhancing agent may be added as indicated at step S3. A preferred non-organic strength-enhancing agent is fumed silica, which may be added to the latex emulsion after it is pre-vulcanized in the form of an aqueous dispersion containing 10–30% (most preferably 15–20%) solid content. After the fumed silica is added, the emulsion should be gently stirred over an extended period such as 1–7 days.

The inorganic strength enhancing agent desirably improves tear & tensile strength without increasing the material's stiffness. Moreover, if the inorganic agent is used instead of the organic agent, the manufacturing process is simplified because stirring is easily performed. On the other hand, temperature control is necessary with the organic agents such as MMA because the polymerization with TEPA generates heat. Further still, elimination of the organic agent and activators therefor (such as TEPA) eliminates undesirable amines in the finished products.

Upon completion of the pre-vulcanization in step S5, the cured latex is cooled immediately to halt any further reactions at step S6, while at S7 appropriate antioxidant(s) are added to the emulsion and mixed uniformly therethrough by continued stirring of the emulsion for an additional length of time such as 15–60 minutes. According to an important aspect of the invention, the antioxidants used are preferably of a type which will not generate nitrosamines in the resulting latex material. Such antioxidants most preferably include phosphite type antioxidants and combinations of phosphite type antioxidants (as the primary component) together with phenolic type antioxidants (as the secondary component). Applicant has determined that a combination of phosphite and phenolic type antioxidants yields a synergistic antioxidizing effect in the resulting latex material. Some specific preferred antioxidants according to the invention are styrenated phenol, 2,2'-methylene bis(6-nonyl-p-cresol), available under the trademark NAUGAWHITE by Uniroyal, and tris(mono-dinonyl-phenyl) phosphite.

At Step S8, the latex emulsion, which has been cooled to an appropriate temperature such as 30–40° C., is discharged from the reaction vessel into a storage vessel where it will remain until it is further processed into thin walled components such as gloves, dental dams and shields, finger cots, foot coverings, etc. The cured latex emulsion may be safely stored in the storage vessel for long periods of time (weeks and months) without substantially any deterioration. At step S9, ammoniated water may be added to dilute the stored latex compound, and in step S10 the stored compound is stirred for at least 30 minutes before it is to be used in forming products.

In the above steps, S3–S6 curing or pre-vulcanization of the rubber latex with the oxygen-donating curing agent is performed concurrently with polymerization of the monomers and/or polymers to the rubber polyisoprene molecules. It is, however, possible to separate these procedures so that the polymerization is effected in a separate step after the rubber latex is vulcanized. Similarly, although the antioxidant(s) are added to the composition in step S7 after the vulcanization and polymerization is completed, the antioxidant(s) may be added to the latex emulsion prior to the vulcanization and polymerization, or the antioxidants could be subsequently added in a subsequent, separate process just prior to formation of the compound into products, for example.

In steps S11–S28, the prevulcanized rubber latex compound is formed into the end products such as glove, finger cots, foot coverings, etc. The steps S11–S24 are preferably performed continuously on a continuous dipping or casting line, while steps S25–S28 are preferably performed off-line.

In step S11, the manufacturing molds or formers are washed in nitric acid, for example in step S12 the formers are dried, in step S13 they are dipped into a coagulant, in step S14 the coagulant is dried, at step S15 the formers are then dipped into the prevulcanized latex compound generated in steps S1–SLO, and in step S16 the dipped latex is predried for an appropriate amount of time such as 0.5–4 minutes at an appropriate temperature such as 100–130° C.

At Step S17, the gloves, which are in wet gel state, are then leached in water for approximately 1–5 minutes at an appropriate temperature such as 70–100° C., and most preferably at about 80° C., after which the latex gloves are then dried in step S18 for approximately 1–5 minutes at approximately 70–110° C., and most preferably at 80° C. At step S19, the gloves are beaded, at step S20 are further dried at a somewhat higher temperature such as 90–110° C. for an appropriate period of time such as 3–6 minutes, and in step S21 the gloves may optionally be again in leached in water for a brief time such as 0.5–3 minutes at 70–90° C., and dried for a similar length of time at a similar temperature.

Leaching of the products formed from the rubber latex compound is necessary for removing several undesired compounds therefrom, including proteins found intrinsically in the latex, proteins generated in the latex compound as a result of reactions with the various chemicals added to the latex emulsion, chemical compounds that are not consumed during the prevulcanization and polymerization processes and which may break down or change their form and undesirably affect the physical properties and aging resistance of the formed products, non-rubber substances in the latex compound, etc. Leaching typically involves soaking the latex products in a medium mainly composed of water at a temperature and duration to achieve the optimal performance of the final products. Additionally, mechanical agitation could be applied during the leaching process. As the performance of the physical properties of the products formed using the sulphur-free latex compound according to the invention depends very much on the leaching efficiency of the product, is preferred that both the wet initial leaching of the product in a wet gel state (S17) and subsequent leaching from the product after it has once been dried (S21) and in a post-leaching step (S25) be performed. The leaching step S21 preferably involves constant exchange of the leaching water for efficiently removing the proteins.

According to another important aspect of the invention, after the gloves are leached and dried in steps S17–S21, a water resistant (and preferably insoluble) coating is applied to the gloves in step S22, the coating being substantially impermeable to latex protein in/on the gloves and is heat resistant such that it remains in a non-flowable state even after prolonged exposure to human body temperatures, such as when the gloves are worn during a lengthy examination procedure. There are two preferred blocking coatings according to the invention. One of the preferred coatings comprises a first layer of a first wax and a second layer of a second wax disposed over the first layer, the second wax having a higher melting point than the first wax. The first wax has a lower softening point than the second wax and functions as a binder for the second wax; whereas the second wax is harder than the first wax and gives a desirable slip to the coated gloves. The coating step S22 preferably involves heating the two layers of wax so as to melt the first layer and securely bind the layers together and to the latex material. Preferably the second wax is an ingestible, non-toxic wax such as carnauba wax conventionally used to coat latex gloves and to coat the candy shells for various candies such as M&Ms®, and the first wax is preferably another non-toxic wax such as several grades of synthetic waxes like Fitsch-Troppe's waxes having an appropriate softening temperature range. Although the first wax is conventionally used as a coating to formulate latex gloves, it tends to melt and cause fouling problems when the gloves are worn for a long period of time, as discussed above, while the second wax prevents the fouling problem because it does not melt at human body temperature even after prolonged exposure thereto. The wax coatings may be applied in conventional manners, such as spraying.

The second preferred coating according to the invention is a silicone based polymeric coating containing silicone (as a supplemental slip agent), fine particles of silicon dioxide and/or waxes (as primary slip agents), plasticisers or tackifiers such as alkylphenolic resins (to improve adhesion to the rubber material) and a binder such as a water based emulsion of polyvinyl acetate. The silicone based coating is preferably applied by dipping and then spraying the latex material. The coating requires heat curing at an appropriate temperature and is then dried or dehydrated in step S23 to achieve optimum performance. The coating is water insoluble and quite impermeable to latex proteins. The second coating is particularly well suited for the latex gloves formed according to the invention using oxygen-donating curing agents rather than conventional sulfur, dicarbamate and zinc containing compounds. The gloves formed with the oxygen-donating curing agents are somewhat tackier than (and not quite as strong as) gloves formed with conventional curing and cross-linking agents, and due to the increased tackiness the gloves according to the present invention are not well suited to the chlorination treatments conventionally applied to conventional latex gloves for removing some latex proteins therefrom. Particularly, products formed of the thin-walled latex material according to the invention are somewhat difficult to handle because of their tackiness. Thus, subsequent processing steps including post-production leaching step S25 and drying step S27 become very difficult and the finished products stick together if the coating is not applied. Further, the coating improves the slip of the finished products, and rehydration after the coating has been dried is minimal.

Either of the coating agents according to the invention may be applied to conventional sulfur-cured latex gloves as well as to gloves formed using the oxygen-donating curing agents according to the invention, and the coatings are effective for blocking a transfer of latex proteins from any type of latex glove.

At step S23 the coated gloves are again dried, for example at 70–90° C. for 2–5 minutes, while in step S24 the gloves are stripped from the formers, thus ending the continuous in-line portion of the manufacturing process. Drying step S23 may be omitted, and the gloves may be stripped in the formers in a wet state in step S24 to facilitate the optional post-production leaching step S25. The post-production leaching step S25 is desirable for improving the physical properties of the latex products and for removing the latex proteins.

In the optional post-leaching step S25, a batch of the stripped gloves are transferred into a tank containing water with a solublizer such as ammonia, and the gloves are again leached for 15–60 minutes at ambient temperature. In step S26 an absorbable dusting powder is applied to the gloves, in step S27 the gloves are dried at, for example, 55–80° C. for 30–60 minutes, and the dried gloves represent the finished product in step S28. Optionally, the gloves may be tumbled, for example, at 70–90° C. for 15–40 minutes between steps S26 and S27 to assure uniform application of the absorbable dusting powder over the gloves'surfaces. Further, the powdering step S27 may be omitted if "powder free" gloves are desired.

Referring to Table I below, characteristics of a latex glove produced according to the invention, including butyl-peroxide, oxygen-donating curing agent, MMA as the organic strength enhancing agent, TEPA as the activator, tert-butyl hydroperoxide as the cross-linking-polymerizing agent, and a silicone-based blocking coating, are disclosed together with the corresponding characteristics of a comparative rubber latex glove produced using conventional sulfur, diocarbamate and zinc compounds in its curing process and without a blocking coating applied thereto. The latex gloves according to the invention are, as expected, free of sulfur, carbamate and zinc compounds, and have been used with complete success in relation to the vinyl polysiloxane DIM, i.e., the DIM completely cures and hardens even after being contacted with the latex gloves when forming an impression of a patient's teeth.

Further, the gloves formed according to the invention are free of the potentially carcinogenic nitrosamine, and thus are very well suited for all applications, even those involving contact with the mouth. The conventional latex glove contains nitrosamine in an amount greater than 2ppm.

Still further, the latex glove according to the invention of a latex protein level of 0.3–0.5, mg/g determined according to the Modified Lowry's Test, whereas the normal level is 2.0–5.0 mg/g. A latex protein level of 0.1 or less is considered absolutely hypoallergenic.

Although the rubber latex gloves according to the invention are somewhat inferior in tensile strength and modulus of elasticity than the conventional rubber latex gloves formed using sulfur and related curing agents, the gloves according to the invention are adequately meet necessary standards for these properties, and may be reliably used for substantially any conventional purpose. Additionally, the gloves according to the invention are somewhat more stretchable than the conventional rubber latex gloves.

TABLE I

| Physical Characteristics | Invention Sample | Comparative Sample | ASTM Limits |
| --- | --- | --- | --- |
| Tensile Strength, MPa | 21-24 | 22-27 | 21 |
| Modules, 300%, MPa | 0.9~1.0 | 1.0~1.1 | Not controlled |
| Elongation, % | 900~1000 | 700~900 | |
| Protein Level, mg/g | 0.3–0.5 | 2.0–5.0 | |
| Nitrosamine | Free | >2 ppm | Not controlled |
| Taste | Not bitter | Not bitter | |
| Smell | of Corn Starch USP | of Corn Starch USP | USP grade |
| Sulfur | Free | Yes | |
| Zinc | Free | Yes | |
| Carbamate | Free | Yes | |

Although there has been described what are present considered to be preferred embodiments of the invention, it will be understood that various modifications and variations may be made thereto without departing from the spirit and essence of the invention. The scope of the invention is indicated by the appended claims rather than by the foregoing description.

We claim:

1. A thin walled rubber latex material, comprising:
   a thin base layer formed of a substantially sulfur free and substantially nitrosamine free rubber latex composition,
   said rubber latex composition being formed from a prevulcanization mixture comprising a natural rubber latex, an oxygen-donating curing agent, an activating agent, and at least one of an emulsifier and a stabilizer therein;
   wherein the prevulcanization mixture is vulcanized into a cured latex emulsion, prior to its being formed into the base layer, and wherein vulcanization of the prevulcanization mixture is permitted to go substantially to completion, such that substantially none of the oxygen-donating curing agent from the prevulcanization mixture remains free in the base layer; and
   a coating provided over the base layer for blocking transfer of latex proteins therefrom,
   the coating being heat-resistant and water-resistant such that it remains in a substantially non-flowable state after prolonged contact with a human body, and comprises a silicone based coating, or a first layer of a first wax and a second layer of a second wax disposed over said first layer, said second wax having a higher melting point than said first wax.

2. A thin walled rubber latex material according to claim 1, wherein said oxygen-donating curing agent includes at least one of a peroxide and a peroxyester.

3. A thin walled rubber latex material according to claim 1, wherein said oxygen-donating curing agent is selected from a group consisting essentially of butyl peroxides, alkyl peroxides, peroxyesters, and combinations thereof.

4. A thin walled rubber latex material according to claim 1, wherein said coating is a silicone based coating.

5. A thin walled rubber latex material according to claim 1, wherein said coating comprises a first layer of a first wax and a second layer of a second wax disposed over said first layer, said second wax having a higher melting point than said first wax.

6. A thin-walled rubber latex material, comprising:
   a thin base layer which is substantially free of sulfur and which is substantially free of nitrosamines, said base layer being formed from a cured latex emulsion comprising a natural rubber latex which is prevulcanized prior to its formation into said base layer, said rubber latex compostion being formed from a prevulcanization mixture comprising a natural rubber latex, an oxygen-donating curing agent, an activating agent ad at least one of an emulsifier and a stabilizer therein;

wherein the prevulcanization mixture is vulcanized into a cured latex emulsion, prior to its being formed into the base layer, and wherein vulcanization of the prevulcanization mixture is permitted to go substantially to completion, such that substantially none of the oxygen-donating curing agent from the prevulcanization mixture remains free in the base layer; and;

a coating covering at least one surface of the rubber latex base layer for blocking transfer of latex proteins therefrom, said coating comprising being heat-resistant and water-resistant such that it remains in a non-flowable state after a prolonged exposure to a human body, and comprises a silicone based coating, or a first layer of a first wax and a second layer of a second wax disposed over said first layer, said second wax having a higher melting point than said first wax.

7. A thin walled rubber latex material according to claim 4 wherein said silicone based coating is a silicone based polymeric coating containing silicone and fine particles of at least one of silicon dioxide and waxes.

8. A thin walled rubber latex material according to claim 7, wherein said silicone based polymeric coating further contains at least one of a plasticiser and a tackifier, and also contains a binder.

9. The material of claim 6, wherein the material is a product of a process comprising the steps of:

mixing together a plurality of materials comprising a natural rubber latex emulsion, an oxygen-donating curing agent, an activating agent, and at least one of an emulsifier and a stabilizer to form a prevulcanization mixture;

vulcanizing the prevulcanization mixture to form said cured latex emulsion;

forming said cured latex emulsion into said base layer; and applying said coating to said base layer.

10. A thin walled rubber latex material according to claim 6, wherein said coating comprises a first layer of a first wax and a second layer of a second wax disposed over said first layer, said second wax having a higher melting point than said first wax.

* * * * *